United States Patent
Goldstein et al.

(12) 
(10) Patent No.: US 6,506,696 B2
(45) Date of Patent: *Jan. 14, 2003

(54) HIGH PERFORMANCE SYNTHETIC NONWOVENS USING POLYMERS HAVING DUAL CROSSLINKABLE FUNCTIONALITY

(75) Inventors: Joel Erwin Goldstein, Allentown, PA (US); Ronald Joseph Pangrazi, Fleetwood, PA (US)

(73) Assignee: Air Products Polymers, L.P., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/817,483

(22) Filed: Mar. 26, 2001

(65) Prior Publication Data

US 2002/0187270 A1 Dec. 12, 2002

(51) Int. Cl.$^7$ .............................. B32B 27/02; B05D 3/02
(52) U.S. Cl. ........................... 442/164; 442/63; 442/71; 442/396; 427/385.5; 427/389.9; 427/393.5; 428/297.7
(58) Field of Search .............................. 427/372.2, 384, 427/385.5, 389.8, 389.9, 393.5; 428/297.4, 297.7, 299.4, 299.7, 295; 442/63, 71, 164, 168, 170, 171, 174, 180, 327, 394, 396

(56) References Cited

U.S. PATENT DOCUMENTS

| 5,919,716 A | * | 7/1999 | Raynolds et al. | ........ 427/389.9 |
| 6,034,005 A | * | 3/2000 | Diehl | .......................... 442/104 |
| 6,117,492 A | * | 9/2000 | Goldstein et al. | ............ 427/391 |
| 6,225,242 B1 | * | 5/2001 | Lau et al. | .................... 428/375 |

* cited by examiner

Primary Examiner—Michael Barr
Assistant Examiner—Rebecca A. Blanton
(74) Attorney, Agent, or Firm—Mary E. Bongiorno

(57) ABSTRACT

A process for forming a synthetic based nonwoven web bonded with a crosslinkable polymer wherein an aqueous polymeric emulsion containing a crosslinkable polymer is applied to the synthetic based nonwoven web, the water removed, and the crosslinkable polymer crosslinked. The crosslinkable polymer incorporates acetoacetate functionality and carboxylic acid functionality; wherein crosslinking is achieved by the reaction of the acetoacetate with an effective amount of a polyaldehyde and the reaction of the carboxylic acid with an effective amount of a polyaziridine compound.

14 Claims, No Drawings

HIGH PERFORMANCE SYNTHETIC NONWOVENS USING POLYMERS HAVING DUAL CROSSLINKABLE FUNCTIONALITY

BACKGROUND OF THE INVENTION

Crosslinking systems for effecting cure of emulsion polymers are used to provide nonwoven articles with a desired property such as water or solvent resistance.

Most crosslinking systems for emulsion polymers which are employed today require temperatures in excess of 100° C. to ensure the development of a decently cured system. While high temperature cures may be acceptable for many applications, such temperatures may be unacceptable in other applications because of an unsuitability of certain types of substrates, operational difficulties, and lastly, they may represent economic hardship due to the high cost of energy.

One type of crosslinking system employed for polymeric binders includes a crosslinking mechanism based upon the use of pendent acetoacetate functionality such as that derived by the polymerization of acetoacetoxyethyl methacrylate (AAEM) into the polymer and a polyfunctional reactant therewith. The acetoacetate containing polymer then can be reacted with a multi-primary amine functional moiety, for example, to effect crosslinking. This combination has a very short pot-life and often requires the addition of a blocking agent which tend to severely retard cure.

Another type of crosslinking functionality for polymeric binders is based upon the reaction of carboxyl functionality and a polyaziridine.

Still another type of crosslinking system is based on dual functionality in the polymeric binder. For example, U.S. Pat. No. 6,117,492 (Goldstein et al., 2000) discloses emulsion polymers utilizing a dual crosslinking package which contains an acetoacetate moiety that reacts with a polyaldehyde, and a carboxylic acid moiety that reacts with a polyaziridine.

BRIEF SUMMARY OF THE INVENTION

The invention is directed to the use of aqueous polymeric binders having dual crosslinkable functionalities to produce high performance nonwoven webs by bonding synthetic fiber based webs or webs comprising a blend of synthetic fibers and cellulosic fibers with the aqueous polymeric binders. The high performance synthetic fiber based webs exhibit unexpected properties. For example, when used as a topsheet, the high performance webs allow water to transport through the web to an absorbent web below and the topsheet remains dry to the touch.

The aqueous polymeric binders used to form the high performance webs of this invention have two functionalities copolymerized into the polymeric backbone—a acetoacetate moiety and a carboxylic acid moiety. Dual crosslinkability is effected by adding a polyfunctional compound capable of reacting with the acetoacetate moiety and adding another polyfunctional compound capable of reacting with the carboxylic acid functionality. A polyfunctional compound capable of reacting with the acetoacetate moiety is a polyaldehyde, preferably a dialdehyde such as glyoxal or glutaraldehyde. A polyfunctional compound capable of reacting with the carboxyl functionality is a polyaziridine functional compound.

The process of forming the high performance nonwoven webs comprises:

applying an aqueous polymeric emulsion containing a polymer having dual crosslinkable functionality to a synthetic based nonwoven web, wherein the dual crosslinkable polymer incorporates acetoacetate functionality and carboxylic acid functionality;

removing water; and crosslinking the crosslinkable polymer with an effective amount of a polyaldehyde and an effective amount of a polyaziridine compound.

There are significant advantages to using a dual crosslinkable polymeric emulsions described herein as a binder for synthetic fiber based nonwoven webs:

an ability to effect a low temperature cure sufficient to approach target performance requirements as currently achieved by thermally activated systems; and an ability to form synthetic based nonwoven fabrics with unexpected excellent topsheet acquisition properties; i.e., properties that render the fabrics dry to touch when exposed to liquids.

DETAILED DESCRIPTION OF THE INVENTION

The aqueous emulsion polymers are produced by emulsion polymerization methods and are described in detail in U.S. Pat. No. 6,117,492 which is hereby incorporated by reference.

Two types of techniques generally have been utilized in preparing polymeric components having activated acetoacetate functionality. One technique involves the addition polymerization of an ethylenically unsaturated monomer having at least one acetoacetate group via solution, emulsion or suspension polymerization. Examples of preferred ethylenically unsaturated monomers capable of providing acetoacetate functionality include acetoacetoxyethyl acrylate (AAEA), allyl acetoacetate, vinyl acetoacetate, acetoacetoxyethyl methacrylate (AAEM) and N-acetoacetylacrylamide. A second technique for preparing the polymeric component having acetoacetate functionality involves the solution or emulsion polymerization of monomers capable of forming polymers having pendant functional groups convertible to acetoacetate units. The use of hydroxyl functional monomers, e.g., hydroxy acrylates, is one way of forming these polymers. Pendent hydroxyl groups then can be converted to acetoacetate units by reaction with an alkyl acetoacetate, e.g., tert-butyl acetoacetate or by reaction with diketene.

Carboxylic acid functionality can be incorporated into the polymer in a variety of ways well known in polymerization technology. A conventional mechanism is in the polymerization of a carboxyl functional monomer with other monomers in polymer formation. Representative carboxyl functional monomers include acrylic and methacrylic acid, crotonic acid, carboxyl ethyl acrylate, maleic anhydride, itaconic acid, and so forth.

The acetoacetate and carboxyl functional monomers can be polymerized with a variety of ethylenically unsaturated monomers having reactive functionality to form the base polymers. Examples of these monomers include $C_{1-13}$ alkyl esters of acrylic and methacrylic acid, preferably $C_{1-8}$ alkyl esters of (meth)acrylic acid, which include methyl methacrylate, ethyl acrylate, butyl acrylate, hexyl acrylate, 2-ethylhexyl acrylate, isooctyl acrylate, isodecyl acrylate and the like; vinyl esters such as vinyl acetate and vinyl propionate; vinyl chloride, acrylonitrile; hydrocarbons such as ethylene, butadiene, styrene, etc.; mono and diesters of maleic acid or fumaric acid, the mono and diesters being formed by the reaction of maleic acid or fumaric acid with a $C_{1-13}$ alkanol, preferably a $C_{1-3}$ alkanol such as, n-octyl alcohol, i-octyl alcohol, butyl alcohol, isobutyl alcohol, methyl alcohol, amyl alcohol (dibutyl maleate is preferred); $C_{1-8}$ alkyl vinyl ethers such as methyl vinyl ether, ethyl vinyl ether, isopropyl vinyl ether, n-propyl vinyl ether, tert-butyl vinyl ether and n-butyl and isobutyl vinyl ether and alpha, beta-ethylenically unsaturated $C_{3-6}$ carboxylic acids and vinyl esters can also be employed. Also vinyl esters of $C_{8-13}$ neo-acids which are comprised of a single vinyl ester or mixture of tri- and tetramers which have been converted to the corresponding single or mixture of $C_{8-13}$ neo-acids may be polymerized.

In producing the relatively ambient temperature dual crosslinkable polymer, the polymer should incorporate from about 1 to 10% preferably 2 to 5% by weight of the acetoacetate functionality as measured relative to the molecular weight of acetoacetoxyethyl methacrylate and based upon the total weight of the polymer. (For monomers other than acetoacetoxyethyl methacrylate, acetoacetate functionality should be relative to the molecular weight of acetoacetoxyethyl methacrylate.) Increasing the level of acetoacetoxyethyl methacrylate or molar equivalent in the polymer beyond about 10% and generally even above about 8% by weight of the polymer may lead to an unstable emulsion or require additional stabilizing surfactant. The latter reduces water resistance. In addition thereto, the system may require an increased level of external crosslinker to effect crosslinking. That increased level too may result in an unstable formulation. Given that the preferred monomer employed in forming the acetoacetate containing polymer is acetoacetoxyethyl methacrylate, the preferred percentage level for polymerized units of acetoacetoxyethyl methacrylate (AAEM) by weight is from 4–8% by weight of the polymer.

Representative Compositions are set forth in the following table:

| Monomer | Broad wt % | Preferred wt % |
| --- | --- | --- |
| Vinyl Acetate | 0–90 | 35–85 |
| Ethylene | 0–25 | 3–15 |
| (Meth)Acrylic Acid | 1–10 | 3–8 |
| Acetoacetoxyethyl (Meth)acrylate | 2–10 | 4–8 |
| $C_{1-8}$ alkyl (Meth)Acrylic Ester | 0–90 | 0–40 |

The sum of the monomer percent must equal 100%.

The polymers should have a Tg of from about −5 to +10° C. and a Mw of from 200,000 to 225,000 and an Mn of from 7,500 to 10,000.

In forming polymers having dual crosslink functionality, the operative level for the carboxylic acid functionality in the polymer typically is from 1–8 weight percent carboxyl functionality based upon the total weight of the polymer (for monomers other than acrylic acid carboxylic acid functionality is measured relative to the molecular weight of acrylic acid.) Preferably, the carboxylic acid containing comonomer is incorporated into the polymer in a preferred percentage range from 2–5% by weight.

Polymerization can be initiated by thermal initiators or by a redox system. A thermal initiator is preferred at temperatures at or above about 70° C. and redox systems are preferred when the polymerization temperature is below about 70° C. is used. The viscoelastic properties are influenced by small changes in temperature and by initiator composition and concentration. The amount of thermal initiator used in the process is 0.1 to 3 wt %, preferably from 0.5 to 1.5 wt %, based on total monomers. Thermal initiators are well known in the emulsion polymer art and include, for example, ammonium persulfate, sodium persulfate, and the like. The amount of oxidizing and reducing agent in the redox system is about 0.1 to 3 wt %. Any suitable redox system known in the art can be used; for example, the reducing agent can be a bisulfite, a sulfoxylate, ascorbic acid, erythorbic acid, and the like. The oxidizing agent can include, persulfates, azo compounds, and the like.

The reaction time will also vary depending upon other variables such as the temperature, the catalyst, and the desired extent of the polymerization. It is generally desirable to continue the reaction until less than 0.5% of the vinyl ester remains unreacted. Under these circumstances, a reaction time of about 6 hours has been found to be generally sufficient for complete polymerization, but reaction times ranging from 2 to 10 hours have been used, and other reaction times can be employed, if desired.

The stabilizing system employed for emulsion polymerization typically consists of 0.5–5 wt %, of a surfactant or a blend of surfactants based on the weight of total monomers charged to the system. The surfactants contemplated for the invention include any of the known and conventional surfactants and emulsifying agents, principally the nonionic and anionic materials, heretofore employed in the emulsion copolymerization of vinyl acetate polyalkoxylated surfactants being especially preferred. Among the nonionic surfactants found to provide good results are the ethoxylated secondary alcohols such as the Igepal surfactants supplied by Rhodia and Tergitols supplied by Union Carbide. The Igepal surfactants are members of a series of alkylphenoxypoly(ethyleneoxy)ethanols having alkyl groups containing from about 7–18 carbon atoms, and having from about 4 to 100 ethyleneoxy units, such as the octylphenoxy poly (ethyleneoxy)ethanols, nonylphenoxy poly(ethyleneoxy) ethanols, and dodecylphenoxy poly(ethyleneoxy)ethanols. Examples of nonionic surfactants include polyoxyalkylene derivatives of hexitol (including sorbitans, sorbides, manitans, and mannides) anhydride, partial long-chain fatty acid esters, such as polyoxyalkylene derivatives of sorbitan monolaurate, sorbitan monopalmitate, sorbitan monostearate, sorbitan tristearate, sorbitan monooleate and sorbitan trioleate. Examples of anionic surfactants include sulfosuccinates, e.g., sodium dioctyl sulfosuccinate.

The use of protective colloids such as polyvinyl alcohol and hydroxyethyl cellulose as a component of the stabilizing system can also be used. The presence of conventional levels of polyvinyl alcohol, e.g., 1 to 3% based upon monomers in the polymerization may be used. Polyvinyl alcohol formed by the hydrolysis of polyvinyl acetate having a hydrolysis value of from 85 to 99 mole % is preferred.

Crosslinking of the polymer having acetoacetate and carboxyl functionality is achieved by reaction with at least two multifunctional reactants—one capable of reacting with the acetoacetate functionality and another with the carboxyl functionality. One of the multifunctional components is a polyaldehyde and preferably a dialdehyde, the other multifunctional component is a polyaziridine. The operative level of each is controlled such that generally at least an effective amount or a stoichiometric amount is added to react with the acetoacetate and carboxyl functionality of the polymer and effect dual crosslinking. To drive the reaction to completion in a short time as required on the production line, an excess of one of the reactants is employed. In crosslinking, through the acetoacetate group each aldehyde group of a dialdehyde can react with the active methylene group of the acetoacetoxy or, alternatively, one of the groups can react with the active methylene group and the other with functionality on the substrate. Examples of aldehydes suited for crosslinking include glutaraldehyde and glyoxal. If glyoxal is used, it typically is added at a level of from about 25 to 125 weight percent of the polymer or from about 50 to 250 wt % when the acetoacetate monomer is considered.

There are numerous polyfunctional aziridinyl compositions that can be used for effecting crosslinking of the polymers containing pendent carboxyl functionality. Representative of polyfunctional aziridines are noted in U.S. Pat. No. 4,278,578 and U.S. Pat. No. 4,605,698 and are incorporated by reference. Typically these polyfunctional aziridine crosslinking agents are aziridine compounds having from 3 to 5 nitrogen atoms per molecule and N-(aminoalkyl) aziridines such as N-aminoethyl-N-aziridilethylamine, N, N-bis-2-aminopropyl-N-aziridilethylamine, N-3,6,9-triazanonylaziridine and the trifunctional aziridine crosslinker sold under the trademark Neocryl CX100. Other examples include bis and tris aziridines of di and tri acrylates of alkoxylated polyols, such as the trisaziridine of the triacrylate of the adduct of glycerine and 3.8 moles of propylene oxide; the tris aziridine of the triacrylate of the adduct of trimethylolpropone and 3 moles ethylene oxide and the tris aziridine of the triacrylate of the adduct of pentaerythritol and 4.7 moles of propylene oxide.

The operative level for the aziridine functional external crosslinker is quite large, e.g., from 25–250% and higher based upon the weight percent carboxyl functionality. Higher levels of aziridine go unused and add to the cost. The aziridine moieties are capable of reacting with a carboxylic acid group and if at least two aziridine moieties react with carboxylic acid groups on two different polymer chains, the polymer chains are crosslinked.

The dual crosslink feature of the polymer is important to achieve significant cure within an appropriate ambient cure temperature range from 20 to 40° C. In effecting cure, the conditions are controlled to flash the water from the emulsion and then effect cure. Water may be flashed at a temperature from 60 to 80° C. under ambient and reduced pressure and the product removed from the heat source and cure being effected without further addition of heat. The polymer typically cures within seconds.

Although significant cures can be achieved with AAEM as the lone crosslinking functionality in the polymer, the performance is not at levels required for many applications. The same is true when acid functional polymers are crosslinked with polyfunctional aziridines. On the other hand, in systems which have both the acetoacetate and the acid functionality, those treated with both glyoxal and aziridine outperform those with only one functionality, regardless of the level of external crosslinker employed.

The method of forming the high performance nonwoven webs of this invention comprises:
  applying an aqueous polymeric emulsion containing a polymer having dual crosslinkable functionality to a synthetic based nonwoven web, wherein the dual crosslinkable polymer incorporates acetoacetate functionality and carboxylic acid functionality;
  removing water; and
  crosslinking the crosslinkable polymer with an effective amount of a polyaldehyde and an effective amount of a polyaziridine compound.

The synthetic based nonwoven webs comprise a structure of fibers or filaments interlayed in a random fashion. A variety of processes have been used to prepare nonwoven webs and can be used in the preparation of the nonwoven webs described herein. For example, air laying can be used to form an airlaid web.

Appropriate synthetic based nonwoven webs are comprised of polyesters, such as polyethylene terephthalate, polyolefins, such as polyethylene or polypropylene, polyamides, such as nylon, and fiberglass. The synthetic based nonwoven web can also be a blend of synthetic fibers or a blend of synthetic fibers with cellulosic fibers, such as pulp.

Methods well known in the art are used to apply a dual crosslinkable emulsion polymer to the synthetic based nonwoven web.

It has been found that use of a synthetic based nonwoven web, compared to a cellulosic web, unexpectedly results in a synthetic based nonwoven with excellent properties that can make it useful for topsheet applications. For example, synthetic based nonwovens of this invention show little or no wetting at the surface when exposed to liquids, such as water, and facilitate transport of liquids through the surface of the fabric when an absorbent material is below them. It is anticipated that these unexpected properties will make the synthetic based nonwovens of this invention useful in products that require a topsheet that remains dry when exposed to liquids, such as in diapers and absorbent pads.

The invention will be further clarified by consideration of the following example, which is intended to be purely exemplary of the invention.

EXAMPLE

An AAEM-vinyl acetate-acrylic acid-ethylene polymer emulsion was prepared by a method as described in Example 6 of U.S. Pat. No. 6,117,492. To a one-gallon steel reactor was charged 524 g of a 2% aqueous solution of Natrosol 250 HR, 524 g of a 2% aqueous solution of Natrosol 250 LR, 28.0 g of an 80% aqueous solution of Tergitol 15-S-20, 11.2 g of Pluronic L-64, 11.2 g of Pluronic F-68 5.0 g of a 1% aqueous solution of ferrous ammonium sulfate, 0.20 g of a 50% aqueous solution of citric acid, 1.2 g of sodium citrate and 476.0 g of vinyl acetate. The reactor was heated to 50° C. and 250 g of ethylene is added. A 3% aqueous solution of ammonium persulfate was added at 0.2 ml/min and a 10% aqueous solution of sodium formaldehyde sulfoxylate was added at 0.33 ml/min. When initiation occurs, a monomer delay comprised of 36.78 g of acrylic acid and 74.2 g of MEM in 1002.2 g of vinyl acetate was added at a rate of 4.6 ml/min for 240 minutes. When the monomer delay was complete, the oxidizer was switched to a 9% aqueous solution of ammonium persulfate and the reaction maintained for an additional hour.

The polymeric emulsion binder, prepared above, was diluted with water to about 20% solids, mixed with 7.5 g of a 40% aqueous solution of glyoxal and 1.5 g of a trifunctional aziridine (Neocryl CX100), and applied to a carded polyethylene terephthalate (PET) web. The treated PET web was heated to 150° F. for two minutes to drive off the water. The treated web was then allowed to equilibrate to room temperature for 12 hours. The level of 'cure' while too low to initiate crosslinking in traditional systems, produced wet tensile strength. The finished, bonded nonwoven was tested for topsheet acquisition properties by applying distilled water to the surface of the topsheet. There was very little, if any, wetting detected. To test this further, an absorbent core was placed below the bonded PET web and the bonded PET web was dosed with water. The water quickly penetrated the topsheet and was contained in the core below. The topsheet remained virtually dry to the touch. These results were quite unexpected, since most vinyl acetate-ethylene binders are hydrophilic. Without being bound by theory, it is believed that the low temperature curing of the polymeric composition caused hydrophobicity.

What is claimed is:

1. A process for forming a synthetic based nonwoven web bonded with a crosslinkable polymer comprising:

applying an aqueous polymer emulsion containing a crosslinkable polymer, a polyaldehyde, and a polyaziridine compound, to a synthetic based nonwoven web;

removing water; and crosslinking the crosslinkable polymer;

wherein the crosslinkable polymer incorporates acetoacetate functionality and carboxylic acid functionality; and crosslinking is achieved by reaction of the acetoacetate functionality with an effective amount of a polyaldehyde and reaction of the carboxylic acid functionality with an effective amount of polyaziridine.

2. The process of claim 1 wherein the synthetic based nonwoven web comprises polyester fibers, polyolefin fibers, polyamide fibers, or a blend of synthetic fibers with cellulosic fibers.

3. The process of claim 1 wherein the synthetic based nonwoven web comprises polyethylene terephthalate fibers, polyethylene fibers, polypropylene fibers, nylon fibers, fiberglass fibers, or a blend of cellulosic fibers with polyethylene terephthalate fibers, polyethylene fibers, polypropylene fibers, nylon fibers, or fiberglass fibers.

4. The process of claim 1 wherein the synthetic based nonwoven web is formed using an airlaid process.

5. The process of claim 1 wherein crosslinking is effected at a temperature from 20 to 40° C.

6. The process of claim 2 wherein the crosslinkable polymer is comprised of polymerized units of the following monomers and are polymerized in the following weight percentages:

| Vinyl Acetate | 0–90 wt % |
| Ethylene | 0–25 wt % |
| (Meth)Acrylic Acid | 1–10 wt % |
| Acetoacetoxyethyl (Meth)acrylate | 1–10 wt % |
| $C_{1-8}$ alkyl (Meth)Acrylic Ester | 0–90 wt % |

7. The process of claim 2 wherein the polyaldehyde is glutaraldehyde or glyoxal.

8. The process of claim 7 wherein the polyaziridine compound is selected from the group consisting of N-aminoethyl-N-aziridilethylamine, N,N-bis-2-aminopropyl-N-aziridilethylamine, N-3,6,9-triazanonylaziridine, the bis and tris aziridines of di and tri acrylates of alkoxylated polyols, the trisaziridine of the triacrylate of the adduct of glycerine and propylene oxide; the trisaziridine of the triacrylate of the adduct of trimethylolpropane and ethylene oxide and the trisaziridine of the triacrylate of the adduct of pentaerythritol and propylene oxide.

9. The process of claim 8 wherein the monomers polymerized into the crosslinkable polymer are:

| Vinyl Acetate | 35–85 wt % |
| Ethylene | 3–15 wt % |
| (Meth)Acrylic Acid | 3–8 wt % |
| Acetoacetoxyethyl (Meth)acrylate | 4–8 wt % |
| $C_{1-8}$ alkyl (Meth)Acrylic Ester | 0–40 wt %. |

10. A synthetic based nonwoven formed by the process of claim 1.

11. A synthetic based nonwoven formed by the process of claim 2.

12. A synthetic based nonwoven formed by the process of claim 3.

13. A synthetic based nonwoven formed by the process of claim 6.

14. A synthetic based nonwoven formed by the process of claim 9.

* * * * *

UNITED STATES PATENT AND TRADEMARK OFFICE
CERTIFICATE OF CORRECTION

PATENT NO.     : 6,506,696 B2
DATED          : January 14, 2003
INVENTOR(S)    : Joel Erwin Goldstein and Ronald Joseph Pangrazi It is certified that error appears in the above-identified patent and that said Letters Patent is hereby corrected as shown below:

<u>Column 8,</u>
Line 6, add the words -- and the sum of said monomers is 100%. -- after the table.

Signed and Sealed this

Thirteenth Day of May, 2003

JAMES E. ROGAN
*Director of the United States Patent and Trademark Office*